United States Patent [19]

Delmas

[11] 4,009,857
[45] Mar. 1, 1977

[54] PIE CRUST FORMING AND TRIMMING MOLD

[76] Inventor: Richard L. Delmas, 7950 Park Blvd., No. 42, Pinellas Park, Fla. 33565

[22] Filed: May 27, 1975

[21] Appl. No.: 580,939

[52] U.S. Cl. .................. 249/102; 249/120; 249/156; 269/302.1; 425/374
[51] Int. Cl.² ............... B29C 1/00; A21C 11/00
[58] Field of Search ............. 249/92, 94, 102, 66, 249/127, 120, 121, 134, 155, 156, 165, DIG. 1, 160; 425/195, 374, 803, 292, 295; 99/432, DIG. 15; 269/302.1

[56] References Cited

UNITED STATES PATENTS

| | | | |
|---|---|---|---|
| 1,531,569 | 3/1925 | Rade | 249/102 |
| 2,181,666 | 11/1939 | Molin | 425/374 X |
| 2,370,925 | 3/1945 | Wade | 249/66 |
| 2,650,552 | 9/1953 | Wood | 425/374 |
| 2,868,145 | 1/1959 | Brooke | 425/374 |
| 2,968,261 | 1/1961 | Tonkin | 99/DIG. 15 |
| 3,122,898 | 3/1964 | Kniffin | 249/127 |
| 3,128,724 | 4/1964 | Linder | 249/102 |
| 3,322,074 | 5/1967 | Malnory | 99/432 X |
| 3,806,078 | 4/1974 | Achzehner | 425/803 |
| 3,867,501 | 12/1972 | Powers et al. | 425/803 |

Primary Examiner—Francis S. Husar
Assistant Examiner—W. R. Briggs
Attorney, Agent, or Firm—Bacon & Thomas

[57] ABSTRACT

A pie crust dough roll out and trimming mold assembly includes a flat base element having a roll out surface thereon and an array of apertures therein for accommodating various size ring mold elements and for preventing their slippage relative to the base by cooperating with protuberances extending from the bottom surfaces of the rings. The ring elements have narrow top surface areas for pinching off excess pie crust dough during the rolling out process, while having wide bottom surfaces for strength and stability. An inclined, downwardly sloping surface connects the narrow top surface area and the outside diameter of the ring elements. The ring elements include internal diameter walls that correspond in height to the desired thickness of the pie crust disc, the internal diameter of the rings corresponding to the external diameters of the desired pie crust discs.

3 Claims, 3 Drawing Figures

PIE CRUST FORMING AND TRIMMING MOLD

BACKGROUND OF THE INVENTION

The expression "simple as pie" may have many proper connotations when used with reference to the basic recipe for pie making. However, rolling out a uniformly thick, properly trimmed pie crust is no simple feat to the novice pie maker and even to a more experienced, but elderly or handicapped baker in the home.

A need for a simple device usable by anyone as a pie crust mold in a household environment, and even under circumstances where a high production rate of pie crusts is desired, such as in a bake shop, that could ensure the production of uniform sized, consistent thickness pie crust that has been properly trimmed has been recognized, and a multitude of prior art on this subject reflects this fact.

Contrary to the probable belief of those uninitiated in the delights of culinary skills, pie crust dough that has been properly prepared is relatively inelastic and not the simplest of materials to roll out to a uniformly thick sheet by hand without cracks or separations occurring, particularly at the edge areas. Frequent pushing together and patching is done to hold the crust together and make it integral, but then continued rolling out creates new defects that again must be repaired.

These problems are not of monumental proportions, of course, but constant repair and re-sizing of the crust as it is being rolled out can alter the texture of the dough adversely, and a poorly rolled out crust simply will not bake uniformly. A few years of practice and experience usually cures the problem, but there is much appeal in a simple pie crust mold device that could become a standard kitchen utensil that is easy to use and to clean, and capable of use even by a child. A foolproof pie crust mold has long been sought after in the prior art and various complex approaches to the design of a pie crust mold usable in the home are readily observable in the prior art on this subject.

The present invention, therefore, has developed from a recognition of the need for a simple, foolproof, pie crust mold that can be inexpensively produced for household use in particular, can be cleaned as easily as a dish or a cup, and which ensures the production of a perfect pie crust every time it is used, assuming that the dough has been otherwise properly prepared.

SUMMARY OF THE INVENTION

This invention lies in the concept of providing a pie crust dough roll out surface that is designed to accommodate different size pie crust forming or molding rings usable in combination with a dough roll out implement, such as a rolling pin. The rings, when completely filled with rolled out pie crust dough form a pie crust disc of desired thickness and diameter right up to the very edge of the disc itself. The rings are each designed to cause the crust to be trimmed properly about its periphery by the rolling pin used to spread the dough within the ring. The roll out surface element and the rings are designed to cooperate with each other so that each ring can be secured to the surface in such a manner that slippage thereof with respect to the surface is prevented. It is envisioned that the roll out surface could accommodate a plurality of different size rings corresponding to the standard diameter pie plates.

The roll out surface and rings are designed to be simple to assemble and to clean, with no other parts required than the surface or base element itself and a ring for each pie crust size desired.

A practical, preferred embodiment of the invention comprises a planar base element including a pie crust dough roll out surface, the base having an array of apertures or the like for enabling the positioning of different size ring mold elements thereon in such a manner that the rings will not slip in a direction parallel to the base surface. The ring mold elements are circular and of thickness corresponding to the desired roll out thickness of the pie crust. The rings include an array of protuberances on their bottom sides which are accommodated by the apertures in the base. The protuberances of each ring would be accommodated in suitable apertures in the base element that were previously arranged to accommodate them when the respective ring is placed on the base element with its bottom surface contiguous to the roll out surface on the base element.

Each ring element includes an upper, planar rolling pin support and dough trimming surface on its top side that is considerably narrower in width than the ring element itself. A downwardly inclined sloping surface makes up the remainder of the upper surface of the ring, the inclined surface serving to catch the excess dough that has been pinched off from the pie crust disc by the rolling pin along the narrow upper surface area of the ring.

In use, the ring of desired size is secured to the base; a ball of dough is placed on the base within the ring; and a rolling pin is placed on top of the ring so as to extend diametrically across same. The dough may be first pressed out manually to reduce its thickness, and is then rolled out by means of the rolling pin which is rolled back and forth across the upper surface of the ring. The dough is rolled out thusly so that it fills out the area within the ring, with the excess dough exuding out over the top edge of the ring. The pressure of the roller on the upper ring surface trims the excess dough from the dough within the ring and subsequent removal of the ring by lifting it from the base leaves a perfectly sized, uniformly thick pie crust disc ready for the pie pan.

The ring and base elements then may be cleaned with the other kitchen utensils in the usual manner. Preferably, the ring and base are made of easily cleanable, inexpensive plastic material that can be mass produced and packaged for sale in a manner similar to other kitchen novelty items and utensils.

DETAILED DESCRIPTION OF THE INVENTION

DETAILED DESCRIPTION

Figure 1:
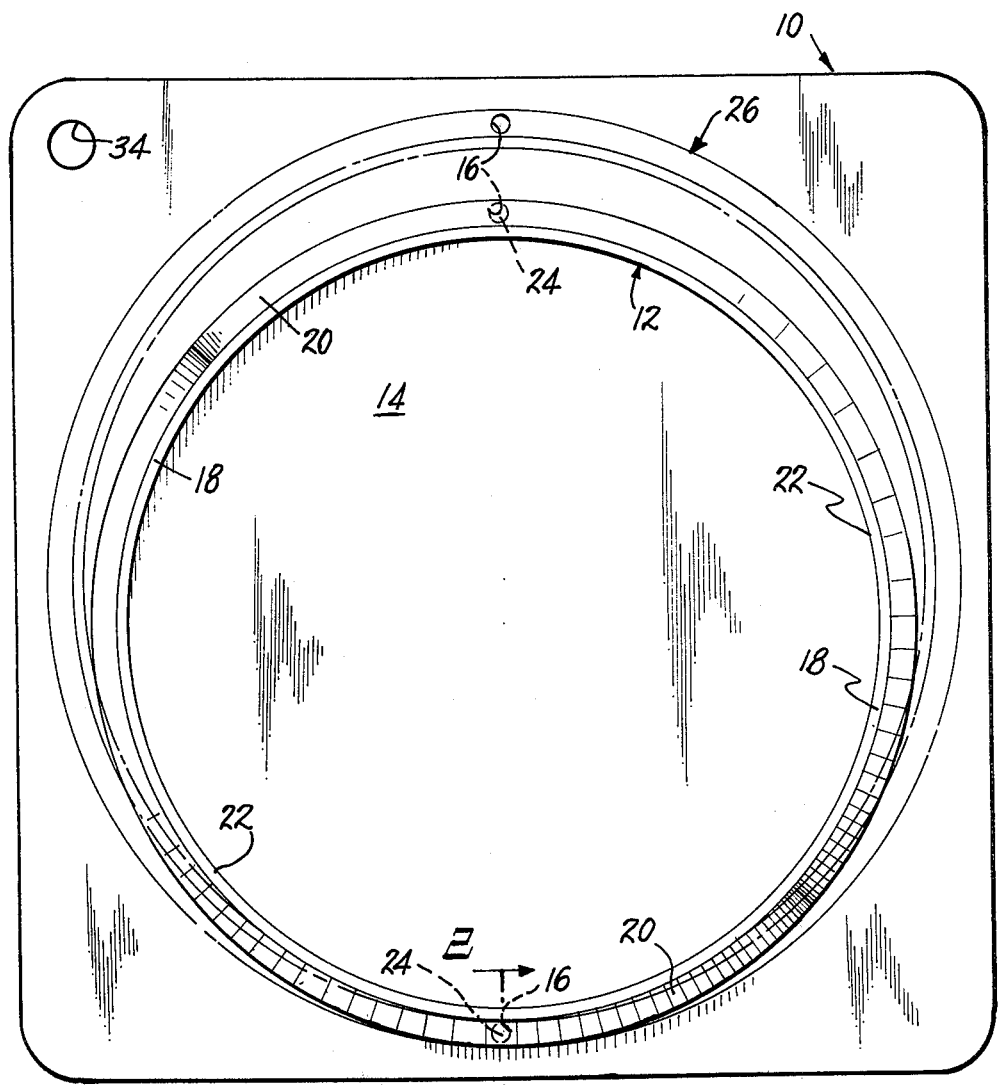
FIG. 1 is a plan view of the assembled base and ring mold element constructed in accordance with a preferred embodiment of this invention.

With reference to FIG. 1, the present invention is embodied preferably in a generally planar base element 10 and at least one circular mold ring element 12. The base 10 includes a pie dough roll out surface 14, and one or more apertures or ring engaging features 16, it being understood that male and female interengaging features are preferred, with the aperture in the base and the protuberance on the ring, as will be discussed. Of course, these relationships could be reversed without departing from the scope of this invention.

Figure 2:
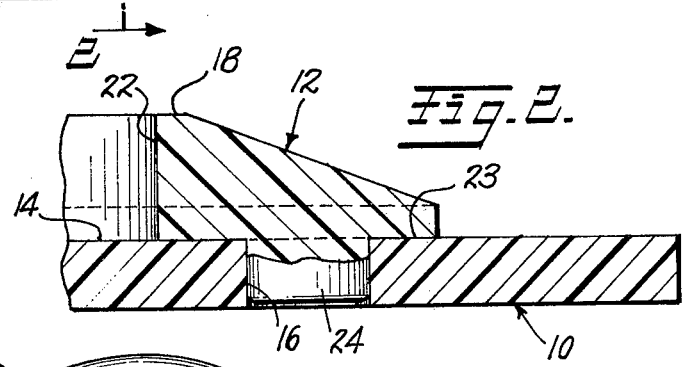
FIG. 2 is an enlarged sectional view taken along 2-2 of FIG. 1.

The ring 12 is usually circular in form and in the shape of a desired pie crust that is to be rolled out from pie crust dough. As shown in FIG. 2, the ring 12, when viewed in transverse cross-section normal to a radial plane extending therethrough, includes at least an upper planar rolling pin support surface that is relatively narrow in width so as to form a narrow ledge 18, and an inclined surface 20 that slopes downwardly away from the ledge in a radial sense so as to extending between the ledge 18 and the outer diameter of the ring 12. At the inside diameter of the ring there is provided a vertical mold surface or wall 22 that corresponds in height to the preferred thickness of the pie crust disc to be formed.

On the bottom surface 23 of the ring 12 there is provided a pair of protuberances 24 which engage snugly a pair of apertures 16 in the base 10, as shown in FIG. 1. Naturally, more protuberances and apertures could be provided, if desired, but the pair of each for each ring size has been found to work quite effectively in practice.

As shown in phantom lines in FIG. 1, a larger pie crust ring mold element 26 would share one aperture 16 at the lower edge of the drawing, while using the other aperture 16 closest to the top side of the drawing. Ring sizes of various diameters, it can readily be seen, will be accommodated by suitable arrays of apertures 16 located where necessary on the base 10 to form at least a pair of anchoring points for each ring.

Figure 3:
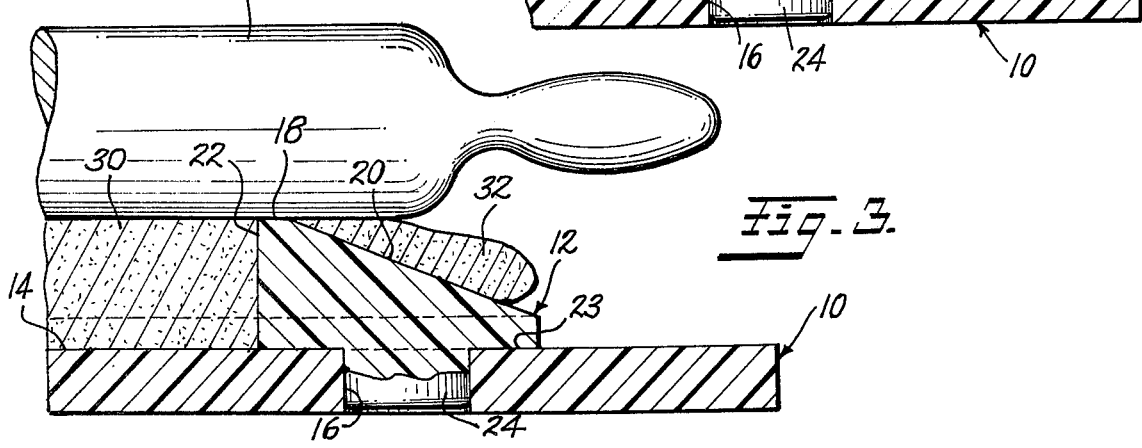
FIG. 3 is a view similar to FIG. 2, showing a rolling pin and pie dough in position during use of this invention.

In use, and with reference to FIG. 3, a ringe 12 is located upon and secured against slippage relative to base 10 as shown in the drawings.

A sufficiently large ball of prepared pie crust dough material is placed within the ring area and a rolling pin 28 is used to roll out the dough 30, with or without a preliminary manual flattening of the ball of dough. The rolling pin is simply rolled back and forth while in contact with the ledge 18 of ring 12 until the dough 30 completely fills the ring 12. Excess dough 32 will be pinched off as it exudes over the ledge 18 by firm pressure on the rolling pin. The inclined surface 20 enables the excess dough to be gently pinched off while it is being rolled out, and minimizes the chances of the dough separating and tearing at the edge of the dough disc. The wider bottom surface of the ring 12 makes the ring quite sturdy and stable during use, while the narrow ledge 18 enables efficient pinching off of excess dough with a minimum of dough build-up between the ring 12 and the rolling pin 28.

By way of an example, a smaller mold ring would have an internal diameter of 11 inches; the inside surface 22 would be .105 inches high; ledge 18 would be .050 inches wide; the slope of surface 20 would be 20° downwardly from horizontal; and the overall width of the ring would be 0.25 inches. The two protuberances on the ring 12 would be 0.20 inches in diameter and would be located diametrically opposite each other on ring 12.

The base 10 would be 13.5 inches square and 0.050 inches thick. An additional aperture 34 could be provided on base 10 for enabling the base and the rings to be mounted on a suitable support hook. The base 10 would be plastic, such as medium density extruded polyethylene sheets which will adhere naturally to a slightly moist, smooth table top or other flat counter surface.

Other rings having different internal diameters would be formed with the same proportions as the ring exemplified above.

Other embodiments of my invention can be envisioned without departing from the scope of my invention, which is intended to be solely limited by the terms of the claims recited below.

I claim:

1. A pie crust dough forming and trimming assembly comprising:
   a. a planar base element forming a planar a dough roll out surface thereon; the base element including an array of apertures extending completely therethrough;
   b. at least one dough mold annular ring element having an annular, flat bottom surface arranged to lie contiguously on said roll out surface and within the outer periphery of said planar base element; the ring element including an internal vertical mold wall corresponding in diameter to the desired diameter of a pie crust dough disc, the height of said wall corresponding to the desired pie crust disc thickness; the bottom surface of the ring element including an array of protuberances extending downwardly therefrom, the protuberances being arranged to fit snugly within said apertures in said base element when the ring element lies contiguously on said roll out surface, said protuberances being spaced from said internal vertical mold wall and lying within the outer periphery of said ring element;
   c. said annular ring element further including a narrow, planar upper ledge surface for supporting a dough roll out implement, and a surface downwardly and radially outwardly sloping from the ledge surface, the ledge surface being adjacent the inner wall of the ring and being narrower than the bottom surface of the ring.

2. A pie crust dough forming and trimming mold assembly as recited in claim 1, further wherein said base element includes still another aperture extending therethrough, and said assembly includes at least an additional second annular dough mold ring element having a planar bottom surface arranged to lie contiguously on said roll out surface, and a second array of protuberances extending from said bottom surface of said second ring, said other aperture and one of the apertures of said array of apertures accommodating said second array of protuberances when said second ring is placed on said base with the bottom surface thereof contiguous with said roll out surface, with one of the apertures of said array of apertures being used in common with both of said ring elements, said second ring element being selectively usable on said base element alternatively with said first ring element, and having a different internal diameter than said ring element.

3. A pie crust dough forming and trimming mold assembly as recited in claim 2, further wherein the apertures are linearly arranged on said roll out surface, and said rings each include only two protuberances that are diametrically spaced on said rings.

* * * * *